United States Patent [19]
Kloberg et al.

[11] Patent Number: 4,474,269
[45] Date of Patent: Oct. 2, 1984

[54] BRAKING DEVICE FOR A POWER CHAIN SAW

[75] Inventors: Reiner Kloberg, Burgstetten; Klaus Höppner, Marbach; Anton Wehle, Fellbach, all of Fed. Rep. of Germany

[73] Assignee: Andreas Stihl, Waiblingen, Fed. Rep. of Germany

[21] Appl. No.: 384,197

[22] Filed: Jun. 3, 1982

[30] Foreign Application Priority Data

Jun. 4, 1981 [DE] Fed. Rep. of Germany ....... 3122214

[51] Int. Cl.³ ...................... B60T 13/04; B27G 19/06
[52] U.S. Cl. ..................................... 188/166; 30/381; 188/196 M
[58] Field of Search ............................ 30/381–383, 30/386; 188/135, 136, 166, 77 R, 196 M

[56] References Cited

U.S. PATENT DOCUMENTS

| | | | |
|---|---|---|---|
| 3,776,331 | 12/1973 | Gustafsson | 188/166 |
| 4,057,900 | 11/1977 | Nagy et al. | 188/166 X |
| 4,334,357 | 6/1982 | Baricevic | 30/381 |

*Primary Examiner*—Duane A. Reger
*Attorney, Agent, or Firm*—Walter Ottesen

[57] ABSTRACT

The invention is directed to a power chain saw incorporating a braking device having a release handle. The chain saw includes a carrying handle spaced a distance from the release handle. At least one of the handles is made of a plastically deformable material and can be deformed so as to cause the spacing between the handles to be adjusted within predetermined limits.

11 Claims, 2 Drawing Figures

BRAKING DEVICE FOR A POWER CHAIN SAW

FIELD OF THE INVENTION

The present invention relates to a braking device for a power chain saw, and is provided with a release mechanism, especially a protective guard, with which is associated at least one adjustment member for adjusting the spacing or distance from a carrying handle of the power chain saw, and at least one securing or retaining part for fixing the position thereof.

BACKGROUND OF THE INVENTION

With the braking device according to German Gebrauchsmuster No. 77 10 560, the release mechanism is an upper part of a hand guard; this release mechanism is pivotably mounted on a lower end portion of the protective guard. The release mechanism has a slot, as an adjustment member, through which a screw bolt projects with play as a securing part which is fixed relative to the lower end portion after adjustment of the release mechanism.

The spacing between the carrying handle and the release mechanism should be within a range of 50 mm plus or minus 10 mm. Values can, however, exceed or fall below this range as a result of manufacturing tolerances of the individual structural parts of the saw, as for example of a handle housing, of a tubular handle of the carrying handle, of a crank shaft housing, etc. Deviations also can arise as a result of the hand guard having to travel through a pivot path with automatic chain brakes. These deviations can lead to an overall tolerance which causes the permissible spacing range to be exceeded. The release mechanism, or even the carrying handle, must for this situation be adjustable to the most favorable permissible determining value existing after assembly of the power chain saw, whereby generally an adjustment of only a few millimeters is necessary.

Such small adjustment distances cannot be attained with sufficient accuracy with the known braking device.

SUMMARY OF THE INVENTION

It is an object of the present invention to design the braking device in such a way that the distance or spacing between the release mechanism and the carrying handle can be easily and accurately adjusted for balancing or equalizing tolerance deviations.

The braking device of the present invention is characterized primarily in that the release mechanism and/or the carrying handle is adjustable by elastic deformation.

With the braking device according to the present invention, the spacing or distance between the release mechanism and the carrying handle is adjusted by elastic deformation of the release mechanism and/or of the carrying handle. The adjustment member is preferably a set screw or adjustment screw which is screwed into the elastically deformable part. This part can be elastically deformed by turning the screw, and the release mechanism or the carrying handle is thereby adjusted. In this way, the spacing or distance between the release mechanism and the carrying handle can be accurately adjusted by only a few millimeters for balancing or equalizing tolerances, whereby this infinitely variable adjustment is especially advantageous. No additional structural parts are necessary for the adjustment device aside from the adjustment member and the securing or retaining part, so that the function of the release mechanism is not affected.

According to specific features of the present invention, an elastically deformable receiving means for the adjustment member may be associated with the release mechanism. The receiving means may be formed by two spaced apart legs of the release mechanism. At least one of the two legs of the release mechanism, and preferably both legs, may be provided with an opening, recess, or passage for receiving the adjustment member. One of the receiving passages may be provided with internal threads for an associated threaded portion of the adjustment member.

The adjustment member may be disposed approximately at right angles to a crosspiece of the carrying handle.

The adjustment member may be held axially unshiftable against the second leg of the receiving means. The adjustment member may be secured in position against the second leg of the receiving means with a screw head and a retaining part, such as a retaining ring, connected thereto. The retaining part may be disposed in an opening which is laterally delimited by the legs of the receiving means; this opening may have a curved bottom between the two legs, and may extend transverse to the axis of the adjustment member. The depth of the opening may be approximately half the width of the hand guard in this region.

The screw head may be countersunk or recessed in a widened segment of the associated passage in the second leg.

BRIEF DESCRIPTION OF THE DRAWING

The invention will now be described with reference to the drawing wherein.

DESCRIPTION OF THE PREFERRED EMBODIMENTS OF THE INVENTION

Figure 1:
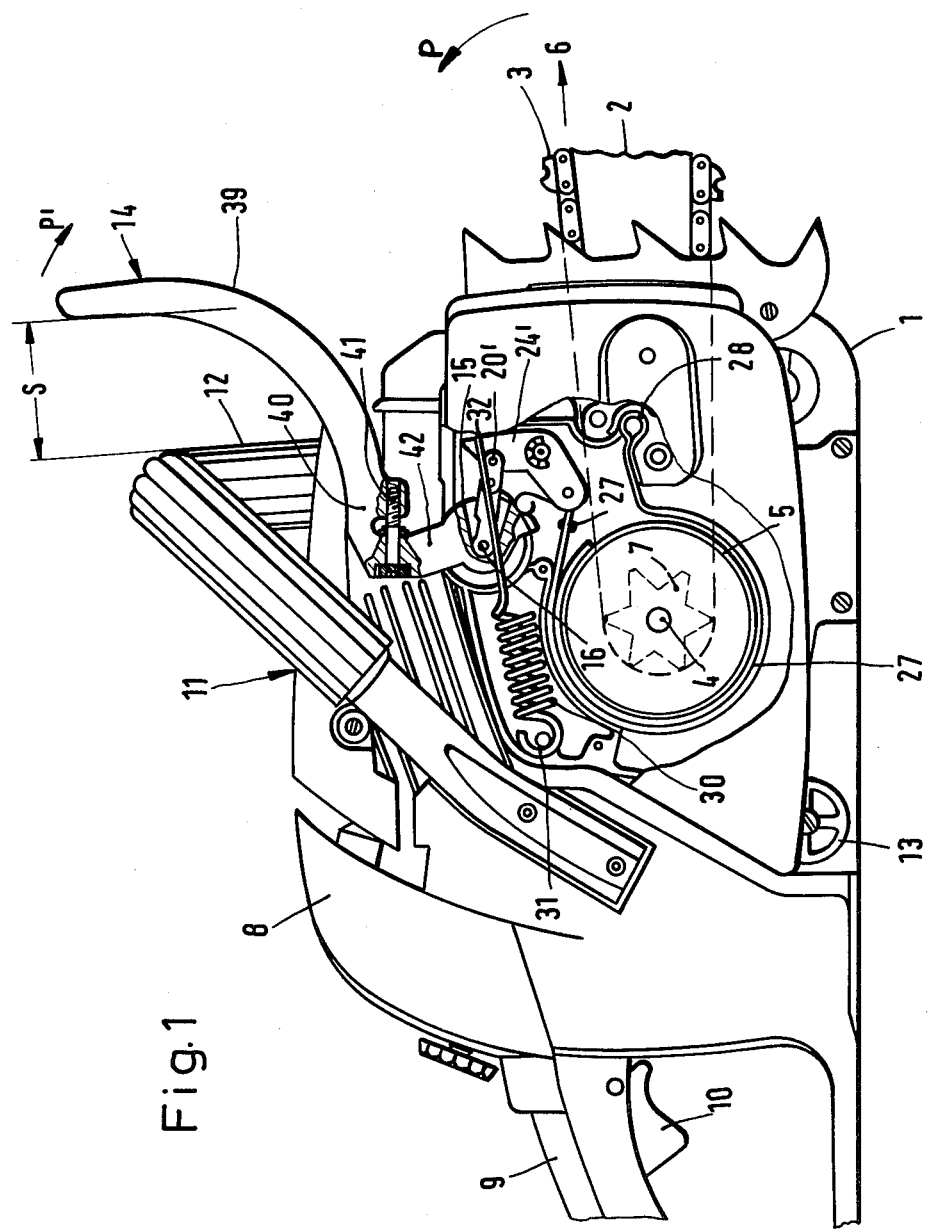
FIG. 1 is a partially sectioned side view of a power chain saw with a protective guard and braking device according to the invention.

Referring now to the drawings in detail, the power chain saw has a housing 1 on which is fastened a guide bar 2 having a circulating saw chain 3; the housing 1 accommodates a non-illustrated internal combustion engine for driving the saw chain. The internal combustion engine is arranged in such a way that its axis of rotation 4 is perpendicular to the cutting plane determined by the guide bar 2. A clutch or coupling drum 5 is rotatably mounted in the housing 1; this drum 5 via flyweights is conventionally brought into frictional connection with a crank shaft of the internal combustion engine when the speed of the internal combustion engine is increased to an operating speed of, for example, more than 5000 revolutions per minute (rpm). In this coupled condition, the saw chain 3 is driven by the internal combustion engine in the operating direction of arrow 6 by means of a drive gear 7 fastened on the outer side of the coupling or clutch drum 5.

So that the power chain saw can be safely and reliably guided during operation, a rigid housing 8 can be provided; this housing 8 supports a handle 9, which is partially illustrated on the left side of the housing 1, and also supports a second carrying handle 11, which projects upwardly above the housing. A control element 10 for the internal combustion engine is arranged on the handle 9. The carrying handle 11 is bow-shaped or U-shaped, and its crosspiece 12 serves as a handle and is disposed transverse to the cutting plane of the saw chain 3.

So that the longitudinal vibrations or oscillations, which arise in the running or operating direction of the saw chain 3 when the power chain saw is used, are not transmitted to the handles 9 and 11, rubberelastic damping members are provided between the motor housing 1 and the handle housing 8 at three locations which are as remote from each other as possible; a lower damping member 13 can be seen in FIG. 1.

A recoil or kickback can occur during a sawing operation, for instance when the saw chain binds or catches in wood during removal of branches; this kickback tends to throw the chain saw in the direction P onto the operator. For the purpose of bringing the drive of the saw chain to a standstill, if possible without delay, in such a danger situation, or at least to be able to slow the saw chain down to such an extent that any danger of accident is avoided, the power chain saw has a braking device which becomes operative when such throwing movements exceed a predetermined value.

Figure 2:
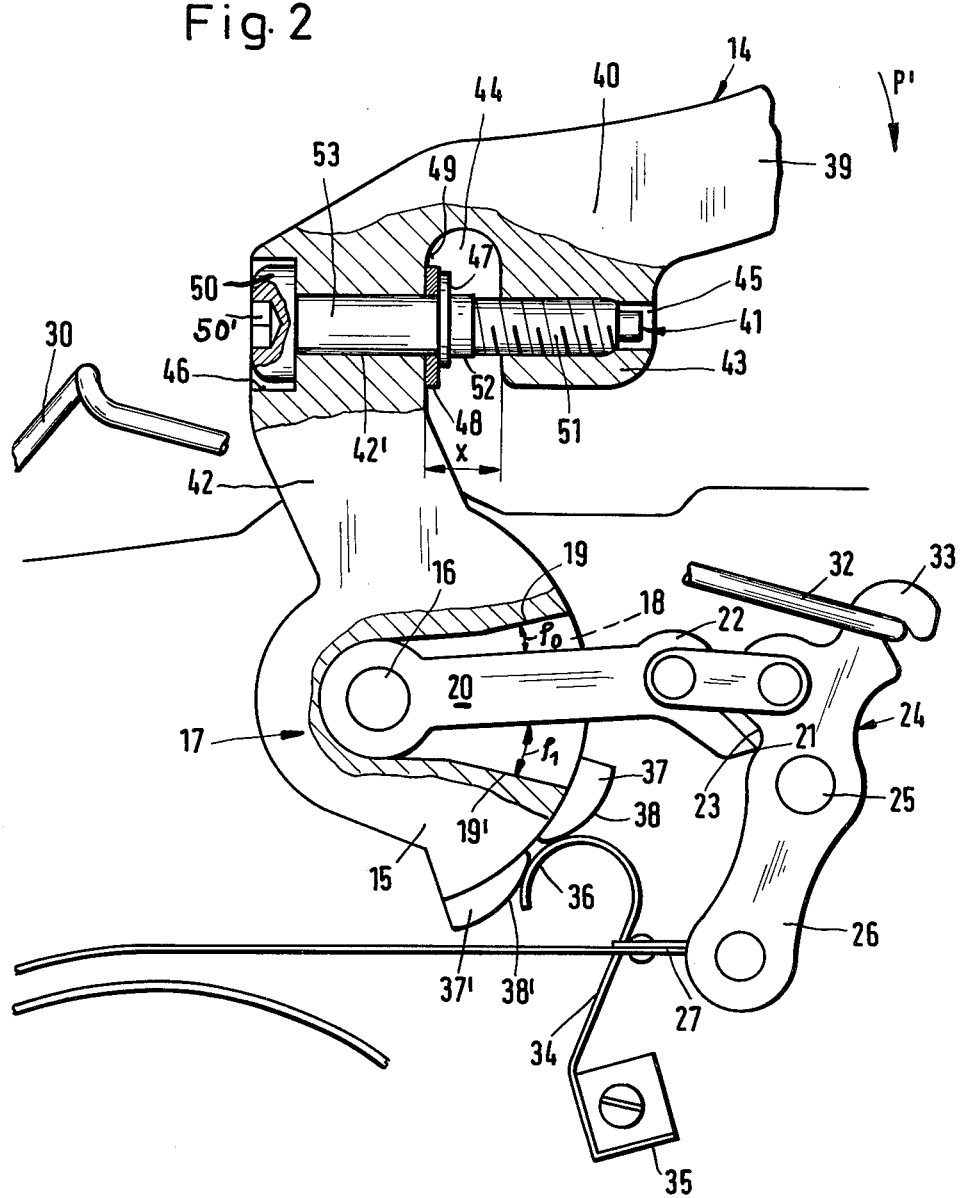
FIG. 2 is a partially sectioned enlarged view of the power chain saw of FIG. 1 in the region of the mounting location of the protective guard, with the associated brake lever and locking or arresting arm being shown in a modified structure.

This braking device is released or triggered by a protective guard 14 which extends a small distance ahead of the carrying handle 11 and is pivotably mounted on the motor housing 1 about an axis formed by a pin 16 which is parallel to the motor axis of rotation 4. For this purpose, the ends of the protective guard 14 are respectively formed as an approximately disc-shaped mounting or bearing part 15. As shown in detail in FIG. 2, part 15 has a recess 17, in the region 18 of which two spaced-apart stops or abutments 19 and 19' formed by the edges of the recess are provided. An arresting or locking arm 20 which is pivotable about the pin 16, is located between the two abutments 19, 19'. The locking arm 20, in the ready position, i.e. when the protective guard is not actuated, has approximately the same angular spacing $p_0$ and $p_1$ from the two stops or abutments 19 and 19', which extend approximately radially relative to the axis of the pin 16. In this ready position, the distance or spacing S (FIG. 1) between the protective guard 14 and the carrying handle 11 is at least 40 mm and at most 60 mm. The locking arm 20, as shown in FIG. 2 in the ready position, has a nose or front edge 21 of the arm 22, which is bent or angled-off at an obtuse angle, disposed in an associated locking recess 23 of a dual-arm brake lever 24. The locking recess 23 is located in a narrow longitudinal side of the brake lever 24 facing the locking arm 20. The brake lever 24 is pivotably mounted on a pin 25 fixed to the housing. The free end of the lower arm 26 of the brake lever 24 is connected with one end of a brake band 27, which is guided around the drum 5 with play; the other end 28 of the brake band 27 is releasably fastened to the motor housing 1 (FIG. 1). The brake band 27 surrounds the drum 5 with a center angle of approximately 270°, and is securely applied to the drum 5 to stop the saw chain. The locking or arresting effected by the locking arm 20 and the brake lever 24 is released in the braking position of the brake band. The brake lever 24 is pivoted counterclockwise under the force of a spiral tension spring 30 (FIG. 1), one end 31 of which is connected in a pull-resistant manner to the motor housing 1; the other end 32 is placed in a hook-like free end 33 of the brake lever 24 (FIG. 2).

The protective guard 14, in its ready position, is held by a holding spring 34 in an unstable equilibrium position, so that the protective guard 14 is only exposed to slight vibrations during operation of the power chain saw. The strength of this holding spring 34 is dependent upon a minimum force and a maximum force, in the limits of which the resistance force of the locking must be kept.

One end 35 of the holding spring 34 is bolted to the motor housing 1 (FIG. 2), while the other, hook-shaped, curved end 36 of the holding spring 34, in the ready position of the protective guard 14, rests against two extensions or projections 37 and 37' secured to the mounting or bearing part 15; the projections 37 and 37' spread away from each other in a wedge manner in the circumferential direction of the mounting or bearing part 15.

When a kickback occurs during overloading of the saw chain 3, for example by binding or catching, the saw body is accelerated in the direction of the arrow P. The protective guard 14 is pivoted in the direction P' as a consequence of inertia, whereby the abutment or stop 19 comes to rest against the locking arm 20. The angular spacing $p_0$ between the stop or abutment 19 and the locking arm 20 is such that the kinetic energy of the protective guard 14 converted during abutment into impact energy is sufficient to release the locking arm 20 from its locking position. The upper arm of the thereby released brake lever 24 then pivots under the force of the spring 30 about the pin 25 in a direction toward the mounting or bearing part 15, with the other lever arm drawing or pulling the brake band 27 against the drum 5. The drum 5 is momentarily stopped or brought to a standstill. At the same time the saw chain is also stopped or brought to a standstill, and the driving connection thereof to the motor is interrupted.

During pivoting of the protective guard 14, the sloped front surface 38 of that projection 37 of the mounting or bearing part 15 located at the rear as seen in a clockwise direction, runs on the spring end 36 and compresses the spring 34, which can pivot the protective guard 14 back into the ready position illustrated in FIG. 1.

The protective guard 14 must be pivoted counterclockwise toward the carrying handle 11 in order to again lift the brake band 27 from the brake drum after standstill of the saw chain 3. The locking arm 20 is taken along by the lower stop or abutment 19' of the mounting or bearing part 15 until the locking arm 20 locks in the locking recess 23 of the brake lever 24. During this reset movement, the brake lever 24 is pivoted back into its starting position against the force of the tension spring 30, thereby lifting the brake band 27 off the drum 5. The holding spring 34 is then again disposed free of deformation between the two projections 37 and 37'.

The brake device can also be actuated if the operator, for instance as a consequence of a kickback, pushes his hand against the protective guard 14. As soon as the protective guard 14 is pivoted about an angle which is greater than the angular spacing $p_0$, the locking between the locking arm 20 and the brake lever 24 is released in the manner described.

The brake device of FIG. 1 differs from the embodiment of FIG. 2 in that an angle lever 24' is provided as a brake lever, and a knee lever 20' is provided as a locking arm. The locking position is determined by the extended position of the knee lever 20'.

The distance or spacing S between the holding crosspiece 12 of the carrying handle 11 and the protective guard 14 should be between 40 and 60 mm. This spacing range can, however, be exceeded by tolerances, for example of the handle housing, of the motor housing, of the carrying handle, and of the protective guard. Deviations from the prescribed maximum or minimum spacing result with the described power chain saw by the installation of the automatic chain brake, especially through the necessary pivoting path of the protective guard 14. As a whole, these deviations can lead to a total tolerance of approximately plus or minus 10 mm. A setting or adjustment of the protective guard 14 is provided so that the necessary values can nevertheless be maintained. For this purpose, the protective guard 14 is elastically deformable.

The protective guard 14 preferably consists of synthetic material, and at each end has an approximately vertically extending leg 42 which connects a partially circular, curved part 39, which is located opposite the crosspiece 12 of the carrying handle 11, with the mounting or bearing part 15. A leg 43, which extends approximately parallel and at a distance from the connecting leg 42, is additionally provided in the transition region 40. Recesses 42' and 45 are provided for a setting or adjustment member 41 in the connecting leg 42 and in the leg 43, respectively; the adjustment member 41 is constructed as a setscrew or adjusting screw. The leg 43, in a side view, has an approximately rectangular outline, and its longitudinal axis is approximately parallel to the longitudinal direction of the guide bar 2. The connecting leg 42, the leg 43, and the transition region 40 delimit an opening 44 which is open along that edge which faces the mounting or bearing part 15. The bottom of the opening 44 is rounded-off cylindrically, and the depth thereof corresponds to approximately half the thickness of the protective guard 14 in the transition region 40.

The protective guard 14, as a consequence of its reduced thickness in this region, and because of the great depth of the opening 44, can be easily elastically deformed. The curved construction of the bottom of the opening 44 prevents the occurrence of stress peaks when pulling stresses and pressure stresses act on the bottom region during adjustment of the adjustment screw 41, so that no cracks can form there, and no danger of breaking exists.

The recess 42' in the connecting leg 42 is constructed as a through-passage with which the recess or passage 45 in the leg 43 is aligned as a threaded bore. The set screw or adjustment screw 41, which is disposed approximately at right angles to the crosspiece 12 of the carryng handle 11, has a threaded portion 51 with which it is screwed into the receiving passage 45. The head 50 of the adjustment screw 41 is recessed or countersunk in a segment 46 of the recess or passage 42' having a widened diameter; the widerdiameter segment 46 is provided on that side of the protective guard 14 remote from the leg 43. The adjustment screw 41 is secured against axial shifting on the connecting leg 42 by a retaining ring or nut 47, and a washer 48 which, within the opening 44, rests against a wall 49 of the connecting leg 42. The adjustment screw 41 serves not only for adjusting the protective guard 14, but also forms a reinforcement in that portion of the guard weakened by the opening 44.

The distance or spacing S of the protective guard 14 from the carrying handle 11 can be varied by turning the adjustment screw 41 to the left or to the right. For this purpose, the head 50 of the adjustment screw 41 has an opening 50' as a socket or recess for a hollow key, Allen wrench, or other adjustment tool. If the adjustment screw 41 is, for example, rotated to the right, the leg 43, as a consequence of the mating threads of the threaded portion 51 and the threaded bore 45, moves in a direction toward the connecting leg 42, whereby the region above the opening 44 of the protective guard 14 yields or deforms elastically. Consequently, the spacing x between the connecting leg 42 and the arm 43 decreases, while the spacing S between the hand guard 14 and the carrying handle 11 increases. The maximum spacing S is determined by engagement of the leg 43 against a collar 52 at the transition region where the threaded portion 51 merges into the shaft part or shank 53 of the adjustment screw 41.

If the adjustment screw 41 is rotated to the left in the other direction, the leg 43 moves away from the connecting leg 42, as a result of which the spacing x between the connecting leg 42 and the leg 43 increases, while the spacing S between the protective guard 14 and the carrying handle 11 decreases correspondingly. The spacing S between the carrying handle 11 and the protective guard 14 can also be varied thereby that, in place of the protective guard 14, or in addition thereto, the carrying handle 11 is constructed to be elastically deformable, and is provided with a recess or receiving means for an associated adjustment member.

The spacing S or x can be infinitely varied with the set screw or adjustment screw 41, so that an accurate setting or adjustment of the protective guard 14 is attained with respect to the carrying handle 11.

Since the adjustment screw 41 with its head 50, and the retaining ring 47 with the washer 48, are held axially unshiftable at the connecting leg 42, there is assured that the leg 43, during rotation of the screw 41, is adjusted immediately by a corresponding distance with respect to the connecting leg 42, and no axial play occurs. Additionally, this prevents, with corresponding loading of the protective guard 14, the leg 43 from being bent against the connecting leg 42, and thereby the adjustment screw 41 from being shifted axially in the recess or passage 42'.

The present invention is, of course, in no way restricted to the specific disclosure of the specification and drawings, but also encompasses any modifications within the scope of he appended claims.

What we claim is:

1. A power chain saw comprising:
    a housing;
    a carrying handle attached to said housing;
    a cutter bar attached to said housing;
    a saw chain movably mounted on said cutter bar; and,
    a braking device for braking the movement of said saw chain, the braking device including:
    brake means for braking the movement of said saw chain; and,
    a release handle operatively connected to said brake means and movable between a first position whereat said brake means is inactive and a second position whereat said brake means is activated to brake the movement of said saw chain;
    said release handle being mounted on said housing so as to be spaced a distance from said carrying handle when said release handle is in said first position;

at least one of said handles being made of an elastically deformable material; and, deformation means arranged with respect to said one handle for deforming said one handle so as to cause the value of said distance to be adjusted within predetermined limits.

2. The power chain saw of claim 1, wherein said one handle is said release handle.

3. The power chain saw of claim 1, wherein said release handle includes a freely extending upper portion spaced said distance from said carrying handle and a lower portion mounted on said housing; said deformation means including receiving means formed on said portions; and adjustment means engaging said receiving means for adjusting the position of said upper portion with respect to said lower portion whereby said distance is adjusted within said predetermined limits.

4. The power chain saw of claim 2, wherein said release handle includes a freely extending upper portion spaced said distance from said carrying handle and a lower portion mounted on said housing; said deformation means including two mutually adjacent legs formed on respective ones of said handle portions; and, adjustment means for engaging said legs for adjusting the separation therebetween whereby the position of said upper portion is changed with respect to said lower portion thereby adjusting said distance within said predetermined limits.

5. The power chain saw of claim 4, said adjustment means including bores formed in respective ones of said legs, one of said bores having an internal thread formed therein; and, a positioning member disposed in said bores and threadably engaging said internal thread.

6. The power chain saw of claim 5, said carrying handle including a crosspiece for manually grasping the chain saw, said bores being arranged in said legs so as to cause said positioning member to be perpendicular to a plane passing through said crosspiece.

7. The power chain saw of claim 5, said deformation means including holding means for holding said positioning member in said other leg so as to prevent axial displacement thereof.

8. The power chain saw of claim 7, said holding means including a head formed on said positioning member and a retaining part for conjointly securing said positioning member in place on said other leg.

9. The power chain saw of claim 8, said two mutually adjacent legs conjointly defining a U-shaped opening therebetween having a curved base and extending transversely to the longitudinal axis of said positioning member, said retaining part being disposed in said U-shaped opening.

10. The power chain saw of claim 9, said U-shaped opening having a depth equal to approximately half of the width of said release handle at the location of said deformation means thereon.

11. The power chain saw of claim 10, said other one of said legs having a wall surface facing away from said opening and a recess formed in said wall surface for accommodating said head of said positioning member.

* * * * *

UNITED STATES PATENT AND TRADEMARK OFFICE
CERTIFICATE OF CORRECTION

PATENT NO. : 4,474,269

DATED : October 2, 1984

INVENTOR(S) : Reiner Kloberg, et al

It is certified that error appears in the above-identified patent and that said Letters Patent is hereby corrected as shown below:

In column 5, line 55: delete "carryng" and substitute -- carrying -- therefor.

In column 5, line 59: delete "widerdiameter" and substitute -- wider-diameter -- therefor.

In column 6, line 13: delete "arm 43" and substitute -- leg 43 -- therefor.

In column 6, line 50: delete "he" and substitute -- the -- therefor.

In column 7, line 9: delete "claim 1" and substitute -- claim 2 -- therefor.

Signed and Sealed this

Sixteenth Day of April 1985

[SEAL]

Attest:

DONALD J. QUIGG

*Attesting Officer*   *Acting Commissioner of Patents and Trademarks*